(12) United States Patent
Krog et al.

(10) Patent No.: US 7,013,738 B2
(45) Date of Patent: Mar. 21, 2006

(54) FLOW SENSOR

(75) Inventors: Jens Peter Krog, Ulstrup (DK); Nicholas Pedersen, Randers (DK); Per Ellemose Andersen, Bjerringbro (DK)

(73) Assignee: Grundfos a/s, Bjerringbro (DK)

( * ) Notice: Subject to any disclaimer, the term of this patent is extended or adjusted under 35 U.S.C. 154(b) by 0 days.

(21) Appl. No.: 10/745,154

(22) Filed: Dec. 22, 2003

(65) Prior Publication Data

US 2004/0134288 A1   Jul. 15, 2004

(30) Foreign Application Priority Data

Dec. 24, 2002   (EP) .................................. 02028959

(51) Int. Cl.
*G01F 1/00* (2006.01)
(52) U.S. Cl. ...................................................... 73/861
(58) Field of Classification Search ............ 73/861.22, 73/861.21, 861.24
See application file for complete search history.

(56) References Cited

U.S. PATENT DOCUMENTS

| | | | | |
|---|---|---|---|---|
| 3,733,897 A | * | 5/1973 | Herzl | 73/861.22 |
| 3,776,033 A | * | 12/1973 | Herzl | 73/861.22 |
| 4,069,708 A | | 1/1978 | Fussell, Jr. | |
| 4,475,409 A | | 10/1984 | Zulliger | |
| 4,862,750 A | | 9/1989 | Nice | |
| 4,896,541 A | * | 1/1990 | Hughes | 73/861.22 |
| 5,121,658 A | * | 6/1992 | Lew | 73/195 |
| 5,880,377 A | * | 3/1999 | Celik | 73/861.22 |
| 6,085,596 A | * | 7/2000 | Jensen et al. | 73/754 |
| 6,257,071 B1 | * | 7/2001 | Dessert et al. | 73/861.22 |

FOREIGN PATENT DOCUMENTS

| | | |
|---|---|---|
| DE | 38 14 444 | 11/1988 |
| DE | 42 16 150 | 11/1992 |
| DE | 196 14 458 | 10/1997 |
| EP | 0 537 710 | 4/1993 |
| EP | 0 801 293 | 10/1997 |
| EP | 1 353 160 | 10/2003 |
| GB | 2 093 997 | 9/1982 |

* cited by examiner

*Primary Examiner*—Edward Lefkowitz
*Assistant Examiner*—Jewel V. Thompson
(74) *Attorney, Agent, or Firm*—McGlew and Tuttle, PC

(57) ABSTRACT

A flow sensor is provided with an obstruction (8) projecting into a flow and at least one measuring probe (10) for measuring a vortex produced by the obstruction (8). The measuring probe (10) includes at least one membrane (12) and a measuring element arranged directly on the membrane (12), for detecting the membrane deflection.

21 Claims, 3 Drawing Sheets

FLOW SENSOR

FIELD OF THE INVENTION

The invention relates to a flow sensor and more particularly to a flow sensor with an obstruction projecting into a flow and with a measuring device measuring near the obstruction.

BACKGROUND OF THE INVENTION

Various types of flow sensors are known in order to determine the through-flow in pipe conduits, for example heating systems. Thus, from U.S. Pat. No. 4,475,409 there is known a vortex flow measurement device. This sensor comprises an obstruction projecting into the flow, which in each case comprises a membrane on sides opposite to one another and extending parallel to the flow. In the inside of the obstruction between the membranes there is arranged a piezoelectric rod as a pressure measurement element which is deflected in dependence on the pressure difference between both membranes in order to detect the differential pressure. With the knowledge of the shape of the obstruction one may determine the flow speed on account of this differential pressure.

This known arrangement has the disadvantage that the construction of the obstruction with the inner-lying pressure measurement element is very expensive. Thus the individual membranes need to be inserted one after the another and subsequently the piezosensitive rod needs to be arranged between the membranes. Furthermore the sensor demands a relatively large construction space to the extent that it may not be applied everywhere.

SUMMARY OF THE INVENTION

It is the object of the invention to provide an improved flow sensor which permits a more economical manufacture, a simpler assembly and a wide field of application of the sensor.

According to the invention, a flow sensor is provided with an obstruction projecting into a flow and with at least one measuring probe for measuring a vortex produced by the obstruction. The measuring probe comprises at least one membrane and a measuring element arranged directly on the membrane for detecting the membrane deflection. A flow sensor with these features achieves this object.

The flow sensor according to the invention comprises an obstruction projecting into the flow and a measurement probe for measuring a vortex produced by the obstruction. From the properties of the produced vortex, with a known size of the obstruction one may determine the flow speed of the flow. For this one may detect pressure differences and/or frequencies of the vortex. The measuring probe comprises at least one membrane and a measuring element arranged directly on the membrane for detecting the membrane deflection. This arrangement permits a very simple construction of the flow sensor since one does not need to assemble a multitude of individual components. Indeed the measuring element or the measuring elements for detecting the membrane deflection is arranged directly on the membrane so that the membrane with the measuring element may be integrated into the flow sensor as one component. Furthermore by way of this construction a considerably more compact design of the flow sensor is created which permits a larger field of application. Such a flow sensor has a greater sensitivity so that more exact measurements are made possible. As a membrane with a measuring element arranged directly on the membrane one may for example use a membrane as is described as a pressure or differential pressure sensor in the European Patent application 97 105 396 or the corresponding German Patent application 196 14 458 and corresponding U.S. Pat. No. 6,085,596. These patent applications and in particular FIG. 1 of these patent applications and the accompanying description are referred to with regard to the exact construction of the membrane and are hereby incorporated by reference. The membrane preferably extends parallel to the flow direction.

The obstruction and the measuring probe are preferably arranged in a pipe conduit section. This pipe conduit section may be part of a pipe conduit of a heating system or a pipe conduit section specially designed as a measurement section path which may be integrated at a suitable location for example into a heating system for detecting the flow speed.

The pipe conduit section preferably has a diameter D which is larger than 10 mm. In preferred embodiment forms the pipe diameter may for example be 10, 12 or 16 mm.

The obstruction is preferably designed as one piece with the pipe conduit section. Thus this obstruction may, for example, be designed as a web which extends through the pipe conduit section in the direction of the diameter. Such a web may be manufactured as one piece with the pipe conduit section or pipe conduit, for example of injection molding of plastic. With the manufacture as a cast part the obstruction may, for example, be formed in a melt core.

The membrane may preferably be impinged by pressure on one side for determining an absolute pressure value. A reference pressure prevails on the other side of the membrane against which the pressure value to be determined is measured. The reference pressure may, for example, be the pressure of the surroundings or the pressure in a closed-off or sealed-off reference volume. The arrangement permits the evaluation of absolute pressure values in a flow in the region of the obstruction in order to evaluate the vortex produced by the obstruction with regard to measuring technology. The detected pressure values, given known variables of the environment, such as pipe diameter and dimension of the obstruction, are characteristic variables which are proportional to the flow speed and thus permit the evaluation of the flow speed or the through-flow through the pipe conduit section.

The membrane may alternatively be impinged on both sides in each case with a pressure for determining the differential pressure. This permits the direct evaluation of the differential pressure in a vortex produced by the obstruction, wherein by way of the reference pressure, with known dimensions of the obstruction and the pipe conduit, one may likewise determine the flow speed or the through-flow from the pressure differences occurring in the vortex. The flow sensor according to the invention according to this embodiment form has the advantage that one only needs to arrange a thin membrane directly in the flow. The membrane may be impinged with pressure directly on both sides since the measuring element or the measuring elements for determining the membrane deflection is or are arranged directly on the membrane. At the same time the design of the membrane preferably corresponds to that of the membrane disclosed in the European Patent application 97 105 396. 2. With this membrane piezosensitive resistances are arranged in the edge region on the surface of the membrane, and on deformation their electrical resistances change and thus permit the evaluation of the membrane deflection. The arrangement of only one membrane permits a quicker and more sensitive flow sensor to be created which permits a more accurate detection of flow speeds, in particular lower flow speeds. The arrangement furthermore permits the construction of smaller measurement probes with only one membrane and thus of very small flow sensors so that the flow sensor according to the invention may be integrated in practically every installation in which the flow speed is to be determined.

The membrane is preferably fixed into a mounting in a pressure-tight manner and an electrically insulating layer is directly deposited onto the membrane and the measuring element arranged on this, wherein the insulating layer is covered by an amorphous metal layer which is at least fluid-tight. This construction corresponds to the construction disclosed in the European Patent application 97 105 396. 2. The electrically insulating layer may be extremely thin since it merely has the task of ensuring that the amorphous metal layer does not short circuit the conductors and electronic components arranged on the membrane. On the other hand due to the covering it is protected by the amorphous metal layer. The deflection of the membrane and thus the measuring accuracy is not noticeably inhibited due to this thin construction of the insulating layer and the amorphous metal layer. The amorphous metal layer ensures an effective protection of the membrane and the measuring elements arranged on the membrane, as well as further electronic components which are arranged on the membrane as the case may be. Since the metal layer is not present as a crystal structure, but as an amorphous structure, which is also described as metal glass, on the one hand it may be corrosion-resistant and on the other hand may be liquid-tight or gas-tight already with the thinnest of layer thicknesses. Such amorphous metal layers are for example known from EP 0 537 710 A1, DE 42 16 150 A1 and DE 38 14 444 A1. The above-mentioned European Patent application 97 105 396. 2 is referred to with regard to the remaining construction of the membrane and is hereby incorporated by reference.

The measuring probe is preferably arranged in a housing which is inserted into an opening in the pipe section. The opening may be designed as one piece with the pipe conduits as a standardized receiver for measuring probes so that the housing with the measuring probe merely needs to be inserted into the opening and fixed here with a non-positive and/or positive fit. Additionally there are provided suitable sealing elements in order to seal the housing with respect to the pipe conduit section. Such a housing is, for example, known from EP 02 008 386 and is indicated there as a housing 22. With regard to this, FIG. 8 and the accompanying description of this European Patent application (EP 02 008 386) are referred to and are hereby incorporated by reference. The complete construction of the housing and the mounting and arrangement preferably corresponds to the arrangement disclosed in EP 02 008 386.

It is further preferred for the measuring probe to be integrated into the obstruction. In this manner one may create a very small flow sensor since it is not necessary to arrange the measuring arrangement in the flow additionally to the obstruction. It is furthermore possible to assemble the obstruction and the measuring probe simultaneously as a construction unit and to replace it on damage where necessary.

The measuring probe may alternatively be arranged behind the obstruction in the flow direction. The obstruction for example may be designed as a web as one piece with the pipe conduit and an opening may be provided behind the web in the flow direction for inserting the measuring probe in the pipe conduit. The measuring probe may then be simply inserted into this opening. At the same time the measuring probe may be a standardized component which may be applied at various locations. With the measuring probe it may for example be the case of a pressure sensor as is disclosed in EP 02 008 386. It thus becomes possible to use a pressure sensor which is present in any case, likewise for the measurement of the through-flow in a pipe conduit section. Simultaneously one may measure an absolute pressure in the flow via this pressure sensor inasmuch as it is the case of a pressure sensor designed as an absolute pressure sensor. This use of a known pressure sensor, in a flow sensor, permits an extremely economical construction of the flow sensor since one may fall back on standard components, and one only needs to arrange a suitable obstruction in the flow cross section or flow channel for designing the flow sensor. Apart from this obstruction and the known pressure sensor which is arranged in a suitable receiver in the pipe conduit one requires no further components for the design of the flow sensor according to the invention. The obstruction may alternatively be formed with the housing of the measuring probe as one part or as one piece so that a flow sensor is created which is applied into the pipe conduit as one component.

Preferably the front edge of the obstruction in the flow direction is distanced from the middle of the measuring probe by the amount X, and the pipe conduit section in which the obstruction is arranged has a diameter D, wherein the ratio X/D lies between 1 and 2. Preferably the ratio X/D lies between 1.25 and 1.5, particularly preferred at 1.3.

It is further preferred, in the flow direction for the front edge of the obstruction to be distanced to the middle of the measuring probe by the amount X and for the obstruction to have a width d transverse to the flow direction, wherein the ratio X/d lies between 2.4 and 10. The ratio X/d particularly preferably lies between 3.96 and 4.55.

The obstruction in the flow direction preferably has a length L and transverse to the flow direction a width d, wherein the ratio L/d lies between 1 and 2. This ratio particularly preferably has a value of 1.57 or 1.67.

The obstruction in the flow direction preferably has a length L and the pipe conduit cross-section in which the obstruction is arranged has a diameter D, wherein the ratio L/D lies between 0.4 and 10. The value of the ratio particularly preferably lies between 2.5 and 10.

The obstruction transverse to the flow direction preferably has a width d and the pipe conduit cross section in which the obstruction is arranged has a diameter D, wherein the ratio d/D lies between 0.2 and 0.4. The value of this ratio is particularly preferably 0.28 or 0.33.

In order to achieve an optimal measurement result the obstruction in the flow direction is preferably situated by a distance $L_1$ behind a curvature of the pipe conduit section in which the obstruction is arranged, wherein $L_1=4*D$ and D is the diameter of the pipe conduit cross section. By way of this distance $L_1$ of the obstruction behind the last curvature of the pipe conduit it is ensured that no eddies produced by the curvature of the pipe conduit interfere with the measurement result at the vortex behind the obstruction.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
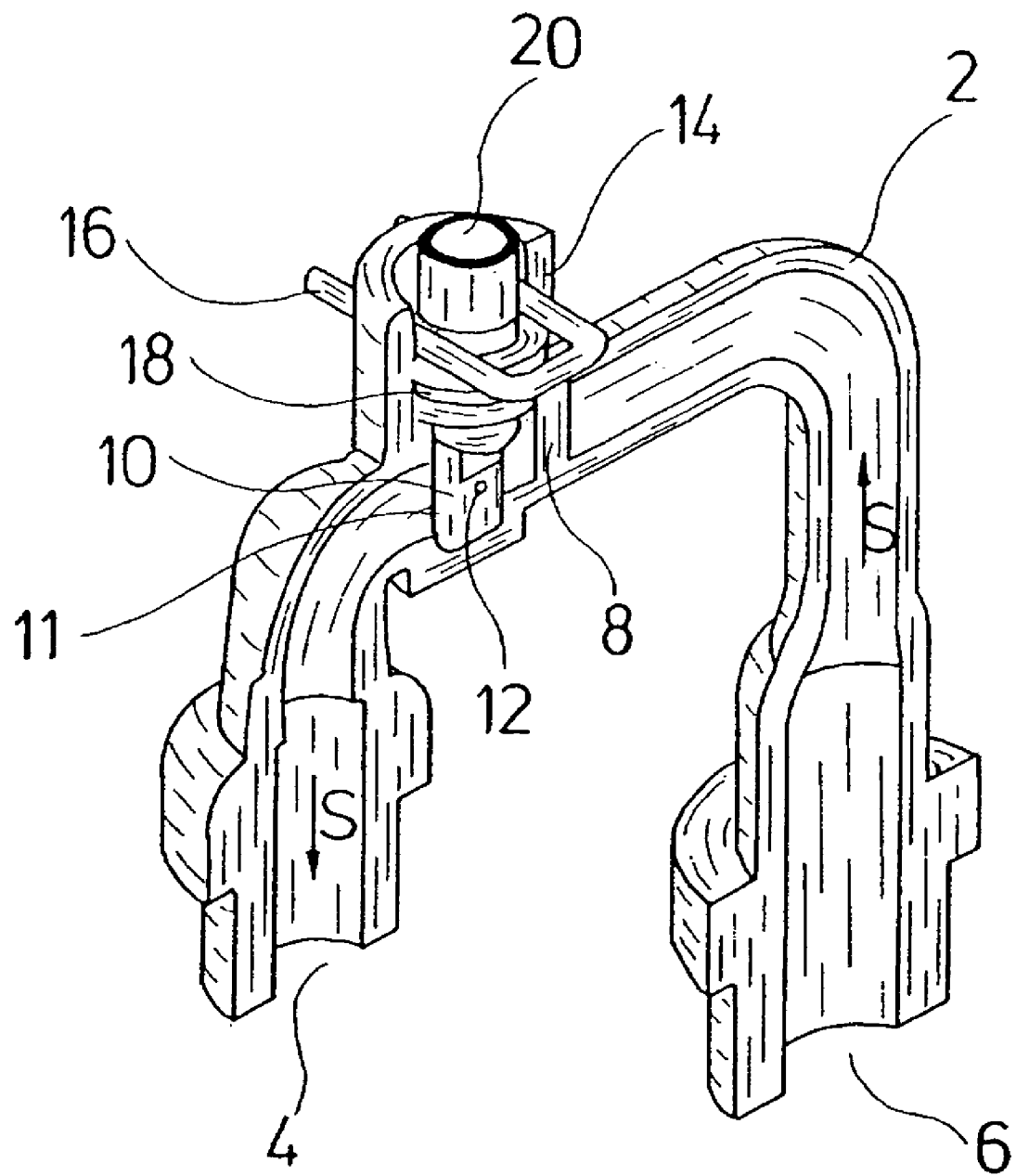
FIG. 1 is a sectioned perspective view of a pipe conduit section with the flow sensor according to the invention.

Referring to the drawings in particular, FIG. 1 in a perspective sectioned view shows a preferred embodiment form of the flow sensor according to the invention. The flow sensor in the embodiment example according to FIG. 1 is arranged in a pipe bend 2. The pipe bend 2 forms a pipe conduit section which at its ends 4 and 6 comprises connection elements for connection to a further pipe, for example in a heating installation. The pipe bend 2 may be designed e.g. of plastic or metal. The pipe bend 2 has a U-shaped configuration wherein in the middle limb of the pipe bend 2 there is arranged an obstruction 8 of a defined shape as a defined resistance in the flow path. The obstruction extends as a web through the inside of the pipe bend 2 in the direction of the diameter. The obstruction thus forms a rod which extends transversely through the pipe conduit.

A measuring probe 10 is arranged behind the obstruction 8 in the flow direction S. The measuring probe 10 serves for measuring the vortex produced in the flow by the obstruction 8. The measuring probe 10 at the same time detects readings within the produced vortex. Since the obstruction 8 has a defined shape, one may deduce the flow speed or the through-flow quantity in the pipe bend 2 from the measured pressures and/or their frequencies of change by way of suitable evaluation with regard to measurement technology. The detection of the flow speed in this manner is known from the so-called vortex through-flow sensors.

With the measuring probe 10 according to the invention it is the case of a measuring probe which comprises at least one membrane and a measuring element arranged directly on the membrane for detecting the membrane deflection. Such a membrane has already been used with a pressure or differential pressure sensor according to the European Patent application 97 105 396.2. This patent application and in particular it FIG. 1 and the associated description are referred to with regard the exact construction of the membrane. This membrane with the measuring elements directly arranged thereon and with an electrically insulating coating as well as an amorphous metal layer covering this to the outside has the advantage of a particularly low membrane thickness which permits a great measuring sensitivity and a rapid reaction of the sensor. The fast reaction capability of this membrane is particularly advantageous when measuring a vortex and in particular the frequency of the pressure fluctuations occurring in this in a vortex through-flow sensor. This membrane construction permits a more compact design of the flow sensor and in particular a more exact detection of the flow speed; in particular of lower flow speeds.

Figure 2:
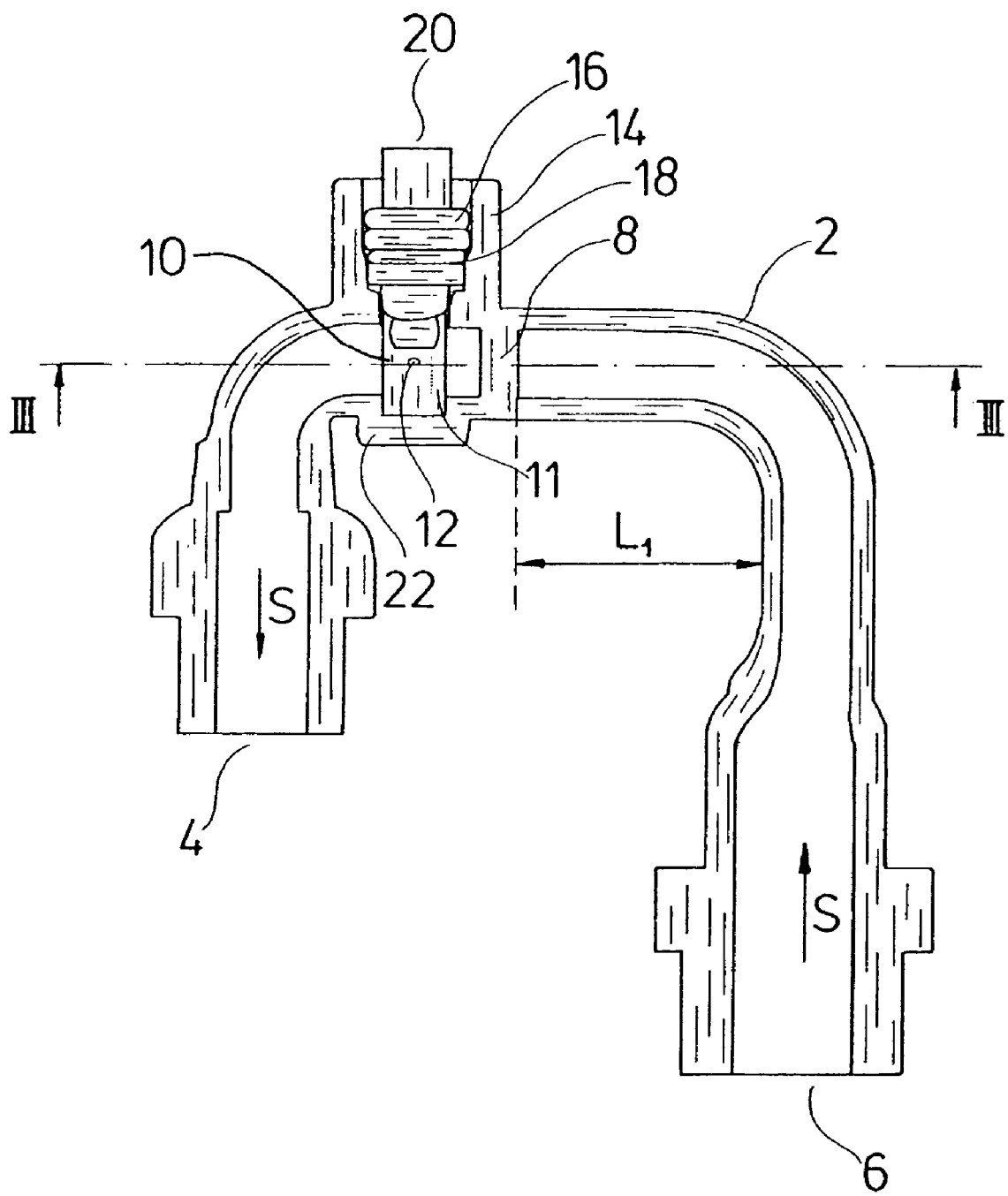
FIG. 2 is a sectional view of the pipe conduit section according to FIG. 1 in the longitudinal direction of the pipe conduit.
Figure 3:
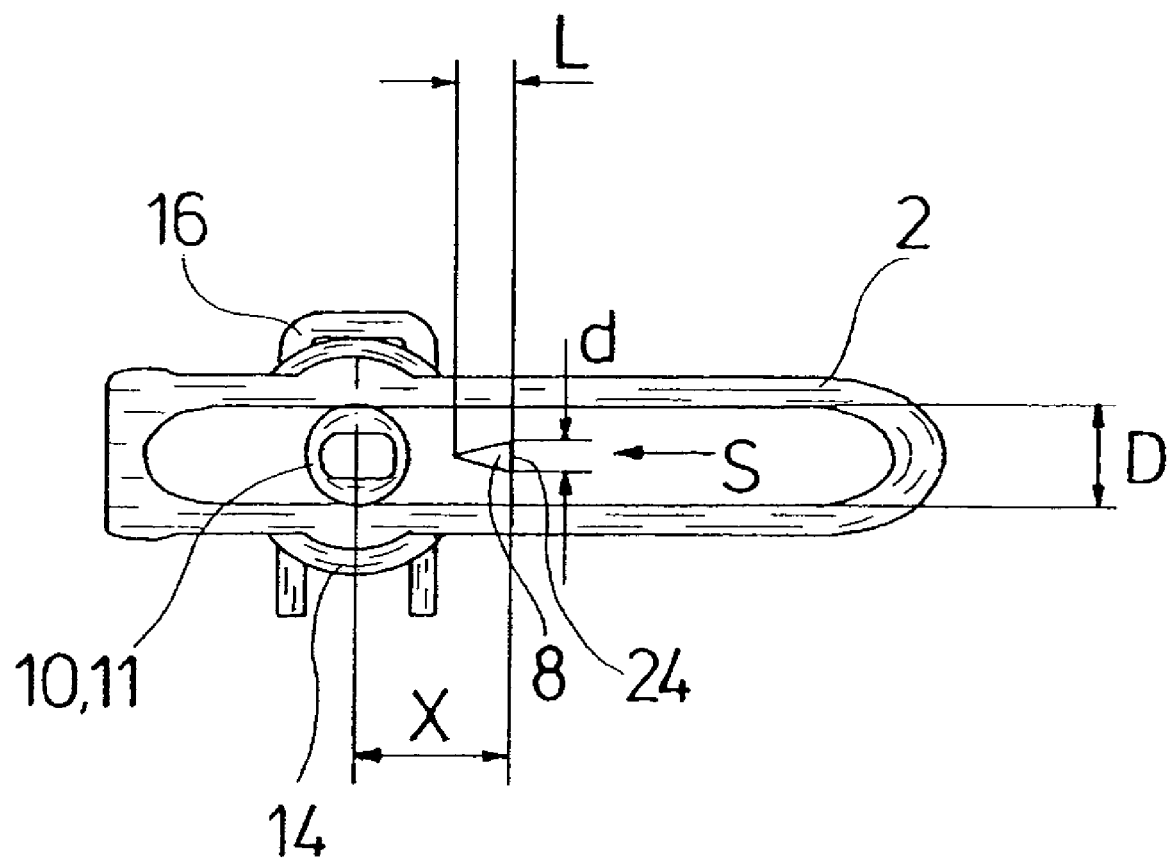
FIG. 3 is a sectional view of the pipe conduit section according to FIG. 2 along line III—III in FIG. 2.

The measuring probe 10 with the membrane in the shown embodiment example is arranged in the housing as a construction unit, as is disclosed in the European Patent application EP 02 008 386 in the FIGS. 2,3 and 8 as well as the associated parts of the description. The disclosure in this patent application is referred to with regard to the exact design of this housing as well as the arrangement of the membrane therein. The housing at its front end comprises a tapered, finger-like extension 11 in which the membrane 12 is arranged. Preferably there is provided only one membrane 12 which may be impinged with pressure on both sides and in this manner one may very simply determine a differential pressure in a vortex behind the obstruction 8. The membrane 12 at the same time is arranged in the flow such that the membrane surfaces extend parallel to the flow direction.

The measuring probe 10 is inserted into an opening in the pipe bend 2 in a manner such that the extension 11 extends into the inner space of the pipe bend 2 in the region behind the obstruction 8 seen in the flow direction S. The opening 14 is designed as a receiver for the measuring probe 10 as one piece with the pipe bend 2. In the opening 14, the measuring probe 10 is fastened by a securing bow 16. A sealing ring 18 is provided on the housing of the measuring probe 10 and this ring seals the opening 14 with an inserted measuring probe 10. The end of the measuring probe 10 comprises the required electrical connections or is connected to electrical connection leads.

FIG. 2 shows a plan view of the section plane in the representation according to FIG. 1. The obstruction 8 is arranged in the pipe bend 2 or on the pipe conduit such that the edge of the obstruction 8 which is at the front seen in the flow direction S is distanced from a previous curvature of the pipe by the amount $L_1$. As is to be seen in FIG. 2, the extension 11 of the measuring probe 10 likewise extends transversely through the whole cross section 11 into a suitable recess 22 on that side of the pipe bend 2 which is opposite the opening 14.

FIG. 3 shows a sectioned view along line III—III in FIG. 2. Preferred dimensions of the arrangement according to the invention are explained by of the view of FIG. 3. The pipe conduit section, i.e. the section of the pipe bend 2 in which the obstruction 8 and the measuring probe 10 are arranged has a diameter D. In the flow direction S the obstruction 8 which has a triangular cross section has a length L. In the direction transverse to the flow direction S the obstruction at its base, i.e. its edge 24 which is at the front in the flow direction S has a width d. The obstruction in the flow direction runs in a pointed or triangular manner from this front edge. The obstruction over its whole extension, in the direction of the diameter through the pipe conduit of the pipe bend 2, has a constant cross section as is shown in FIG. 3. The obstruction 8 at the same time is arranged centrally in the inside of the pipe of the pipe bend 2.

The front edge or forward edge 24 in the flow direction S of the obstruction 8 is distanced by the amount X from the middle of the measuring probe 10 in which the membrane 12 is arranged.

Preferred dimensions for the distance L, the distance $L_1$ (see FIG. 2), the diameter D, the distance X and the width d and their relationship to one another are listed in the subsequent table. With this the preferred minimal and maximal values for the individual variables are specified. There are further specified three specific embodiment examples in the columns A, B and C which specify the respective dimensions for certain preferred embodiment forms of the flow sensor.

|  |  | A | B | C | Interval Min | Interval Max |
|---|---|---|---|---|---|---|
| Pipe diameter | D[mm] | 10 | 12 | 16 | 10 | |
| Width of the the obstruction | d[mm] | 3.3 | 3.3 | 5.3 | — | — |
| Length of the obstruction | L[mm] | 5.5 | 5.5 | 8.3 | — | — |
| Diameter ratio | d/D | 0.33 | 0.28 | 0.33 | 0.20 | 0.40 |
| L/d | L/d | 1.67 | 1.67 | 1.57 | 1.00 | 2.00 |
| L/D | L/D | 0.55 | 0.46 | 0.52 | 2.5 | 10.00 |
| Distance of the front edge of obstr. to the middle of the measuring probe | X[mm] | 15.0 | 15.0 | 21.0 | — | — |
| X/D | X/D | 1.50 | 1.25 | 1.31 | 1.00 | 2.00 |
| X/d | X/d | 4.55 | 4.55 | 3.96 | 2.5 | 10.0 |
| Distance of the obstruction to the pipe bend | $L_1$ | 4D | 4D | 4D | 4D | — |
| Minimum Reynolds number | RE_low [-] | 2546 | 3006 | 3979 | 2500 | — |
| Maximum Reynolds number | RE_high [-] | 42441 | 44210 | 39789 | — | 50000 |

The last two columns of the table specify the minimal or maximal values for the respective variables. With this design one may achieve Reynolds numbers between 2,500 and 50,000.

While a specific embodiment of the invention has been shown and described in detail to illustrate the application of the principles of the invention, it will be understood that the invention may be embodied otherwise without departing from such principles.

What is claimed is:

1. A flow sensor, comprising: an obstruction projecting into a flow; and a measuring probe for measuring a vortex produced by the obstruction, said measuring probe comprising at least one membrane arranged directly in the flow and a measuring element arranged directly on the membrane for detecting the membrane deflection.

2. A flow sensor according to claim 1, further comprising a pipe section, wherein said obstruction and said measuring probe are arranged in said pipe conduit section.

3. A flow sensor according to claim 2, wherein said pipe conduit section has a diameter D which is larger than 10 mm.

4. A flow sensor according to claim 2, wherein the obstruction is designed as one piece with the pipe conduit section.

5. A flow sensor according to claim 1, wherein the membrane may be impinged on one side with a pressure, for determining an absolute pressure value.

6. A flow sensor according to claim 1, wherein said at least one membrane consists of a single membrane impinged on both sides in each case with a pressure, for determining a differential pressure.

7. A flow sensor according to claim 1, further comprising a membrane mounting wherein said membrane is fixed into said membrane mounting in a pressure-tight manner and an electrically insulating layer is deposited directly onto said membrane and onto the measuring element arranged on said membrane, said layer being covered by an at least fluid-tight amorphous metal layer.

8. A flow sensor according to claim 2, further comprising a housing wherein said measuring probe is arranged in said housing and said housing is inserted into an opening in said pipe conduit section.

9. A flow sensor according to claim 1, wherein said measuring probe is integrated into said obstruction.

10. A flow sensor according to claim 1, wherein said measuring probe is ranged behind the obstruction with respect to a flow direction.

11. A flow sensor according to claim 10, further comprising a pipe section, wherein said obstruction and said measuring probe are arranged in said pipe conduit section and wherein in the flow direction a front edge of said obstruction is spaced a distance from a middle of said measuring probe by an amount X, and the pipe conduit section has a diameter D, wherein the ratio X/D lies between 1 and 2.

12. A flow sensor according to claim 10, wherein in the flow direction a front edge of said obstruction is spaced a distanced from a middle of the measuring probe by an amount X and said obstruction transverse to the flow direction has a width d wherein the ratio X/d lies between 2.5 and 10.

13. A flow sensor according to claim 10, wherein the obstruction in the flow direction has a length L and transverse to the flow direction a width d, wherein the ratio L/d lies between 1 and 2.

14. A flow sensor according to claim 10, wherein the obstruction in the flow direction has a length L and the pipe conduit section in which said obstruction is arranged has a diameter D, wherein the ratio L/D lies between 0.4 and 10.

15. A flow sensor according to claim 10, further comprising a pipe section, wherein said obstruction and said measuring probe are arranged in said pipe conduit section and wherein said obstruction transverse to the flow direction has a width d and said pipe conduit section has a diameter D, wherein the ratio d/D lies between 0.2 and 0.4.

16. A flow sensor according to claim 10, further comprising a pipe section, wherein said obstruction and said measuring probe are arranged in said pipe conduit section and wherein the obstruction in the flow direction is situated at least by a distance $L_1$ behind a bend of the pipe conduit section in which said obstruction is arranged, wherein $L_1=4*D$ and D is the diameter of the pipe conduit section.

17. A flow sensor comprising:
a conduit;
an obstruction projecting into said conduit, said obstruction generating a vortex in a flow carried by said conduit;
a measuring probe arranged in said conduit and measuring the vortex, said measuring probe including a membrane arranged in the conduit extending into the flow carried by the conduit and including a measuring element arranged directly on said membrane for detecting a deflection of said membrane.

18. A sensor in accordance with claim 17, wherein:
said measuring probe includes only a single membrane arranged in said conduit with flow passing along of two opposite sides of said membrane.

19. A sensor in accordance with claim 17, wherein:
said membrane includes an electrically insulating layer and an amorphous metal layer on said insulating layer.

20. A sensor in accordance with claim 17, wherein:
said obstruction is arranged to generate a plurality of vortexes;
said membrane is arranged in said conduit with said plurality of vortexes passing against opposite sides of said membrane and said membrane is arranged to be deflected by the passing of the vortexes.

21. A flow sensor comprising:
a conduit with fluid flowing through having a direction of flow;
an obstruction projecting into said conduit for fluid to flow thereby, said obstruction generating vortexes downstream with respect to said direction of flow of the fluid flowing through said conduit;
a measuring probe arranged in said conduit and measuring the vortexes, said measuring probe including a single membrane having a first side and an opposite second side ranged directly in the fluid flowing through said conduit, said single membrane being arranged downstream of said obstruction first fluid to flow by said first side and by said opposite second side with said first side and opposite second side being arranged to be deflected by the passing of the vortexes and said measuring probe including a measuring element arranged directly on said membrane for detecting a deflection of said single membrane.

* * * * *